United States Patent Office 2,975,969
Patented Mar. 21, 1961

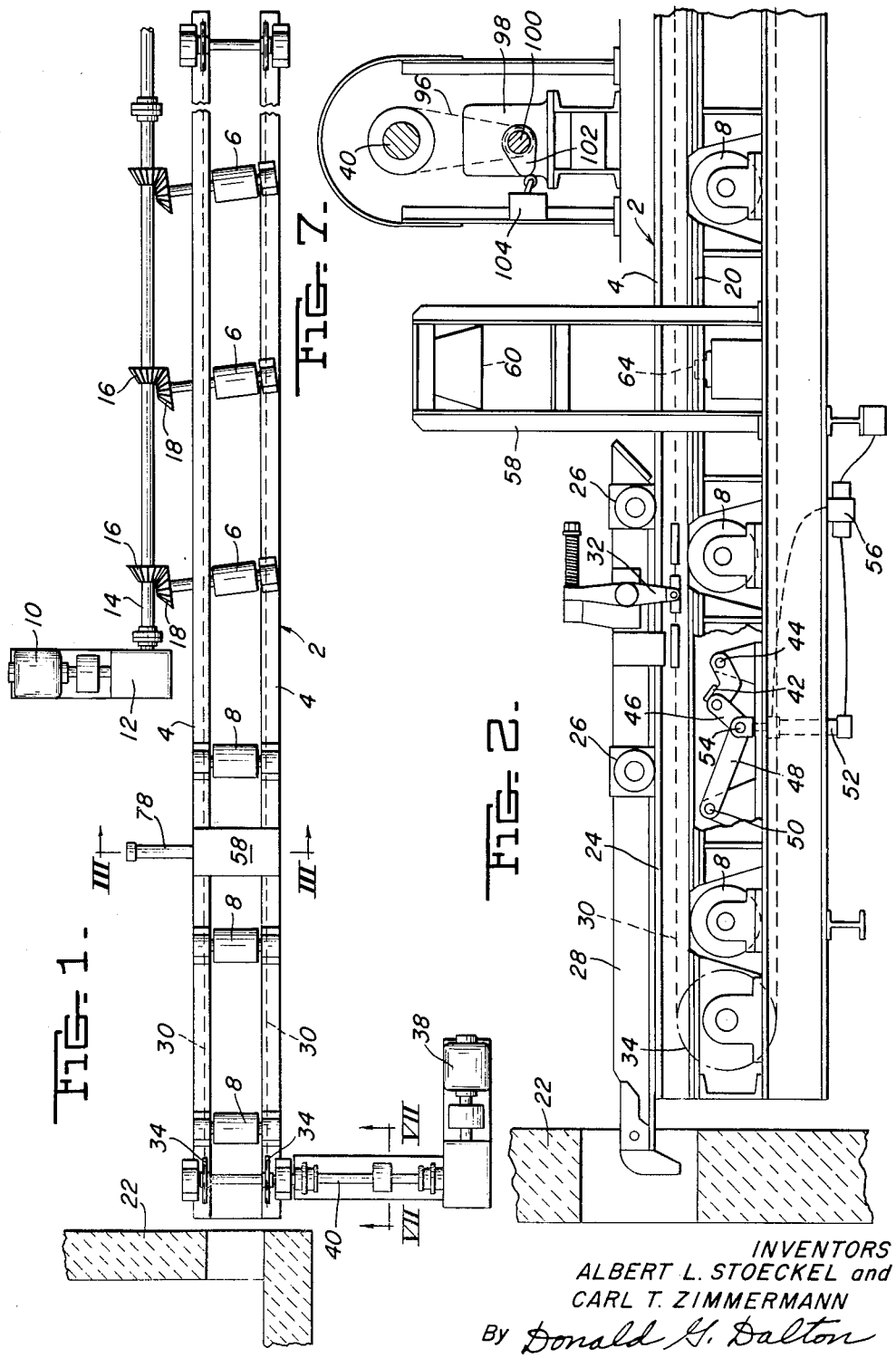

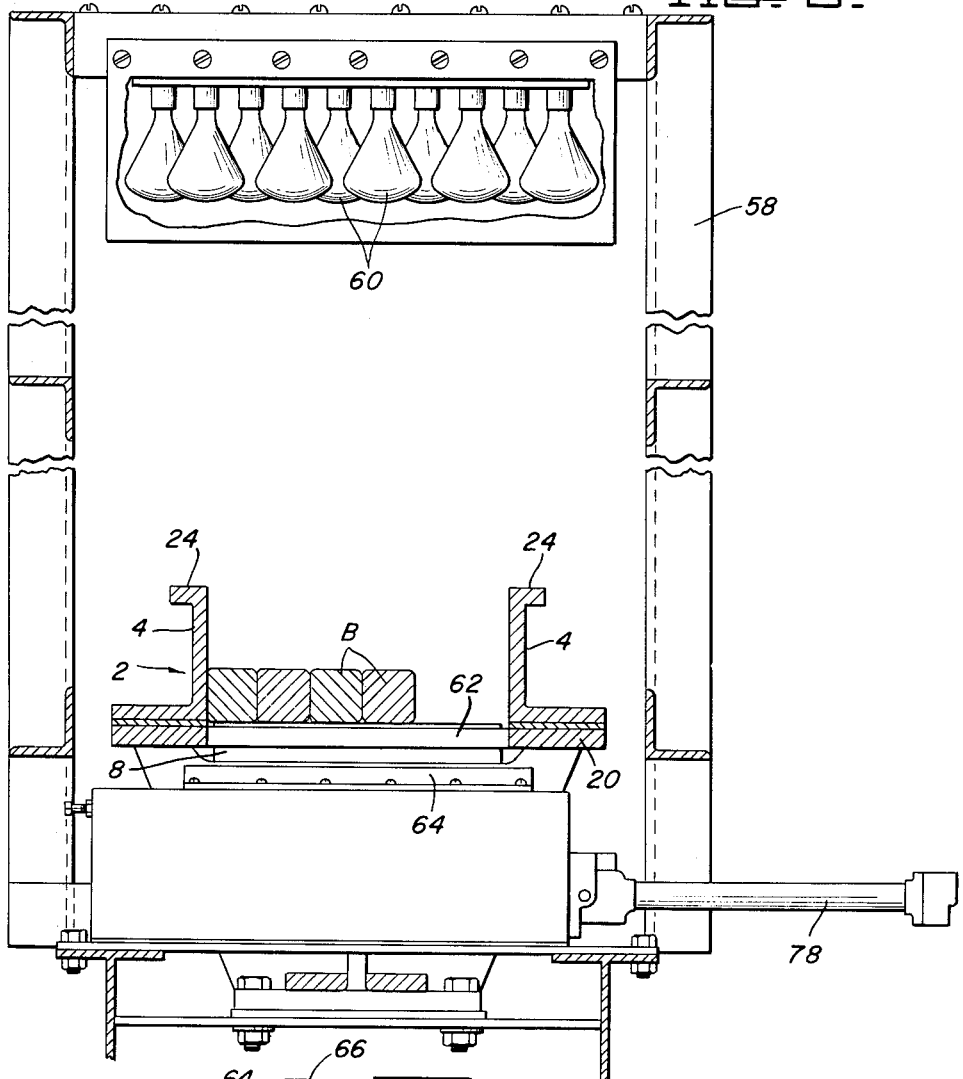
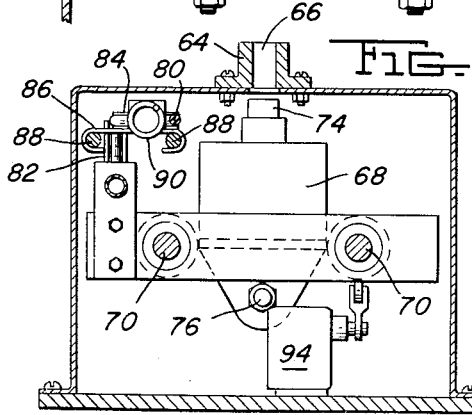

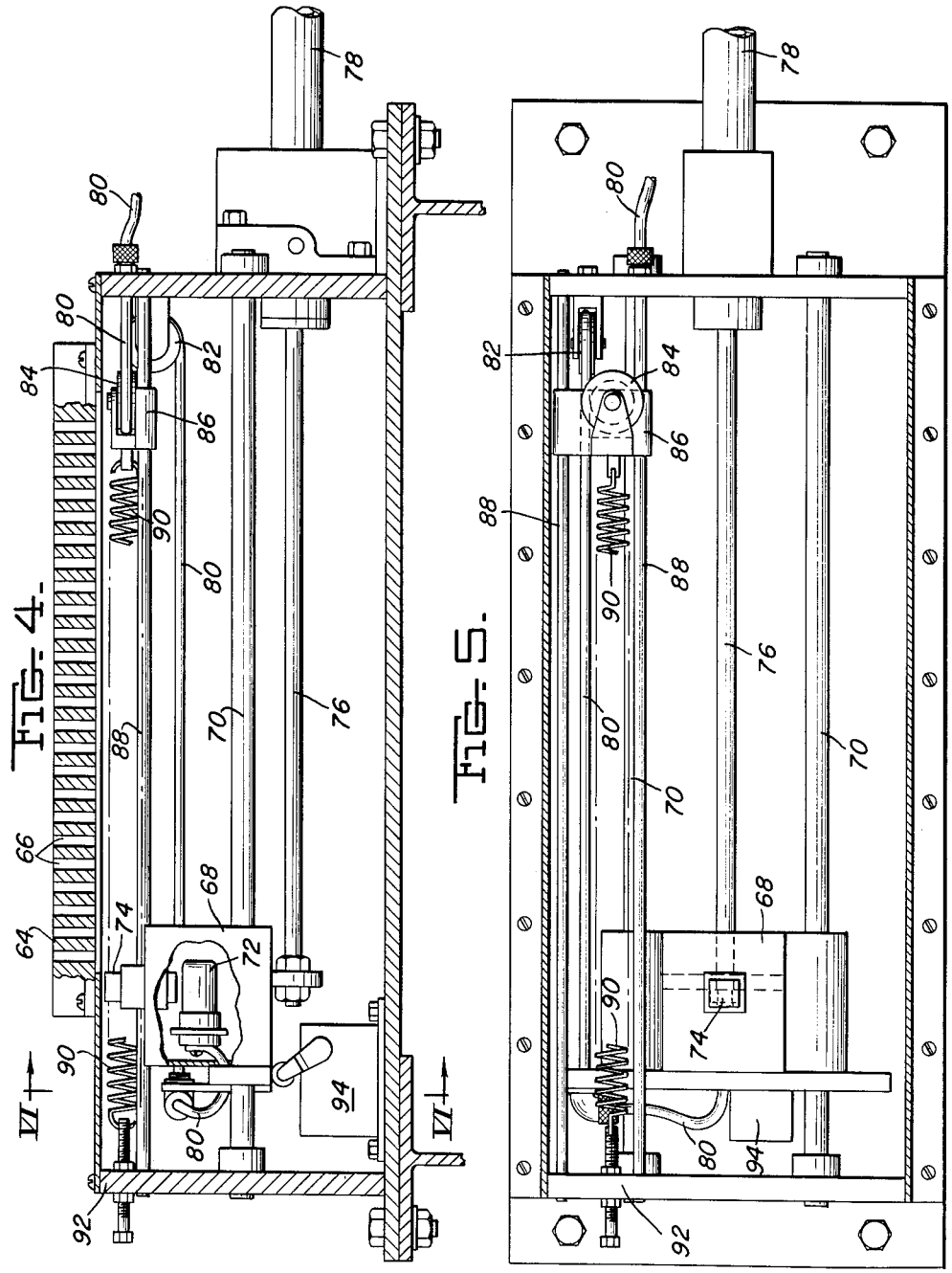

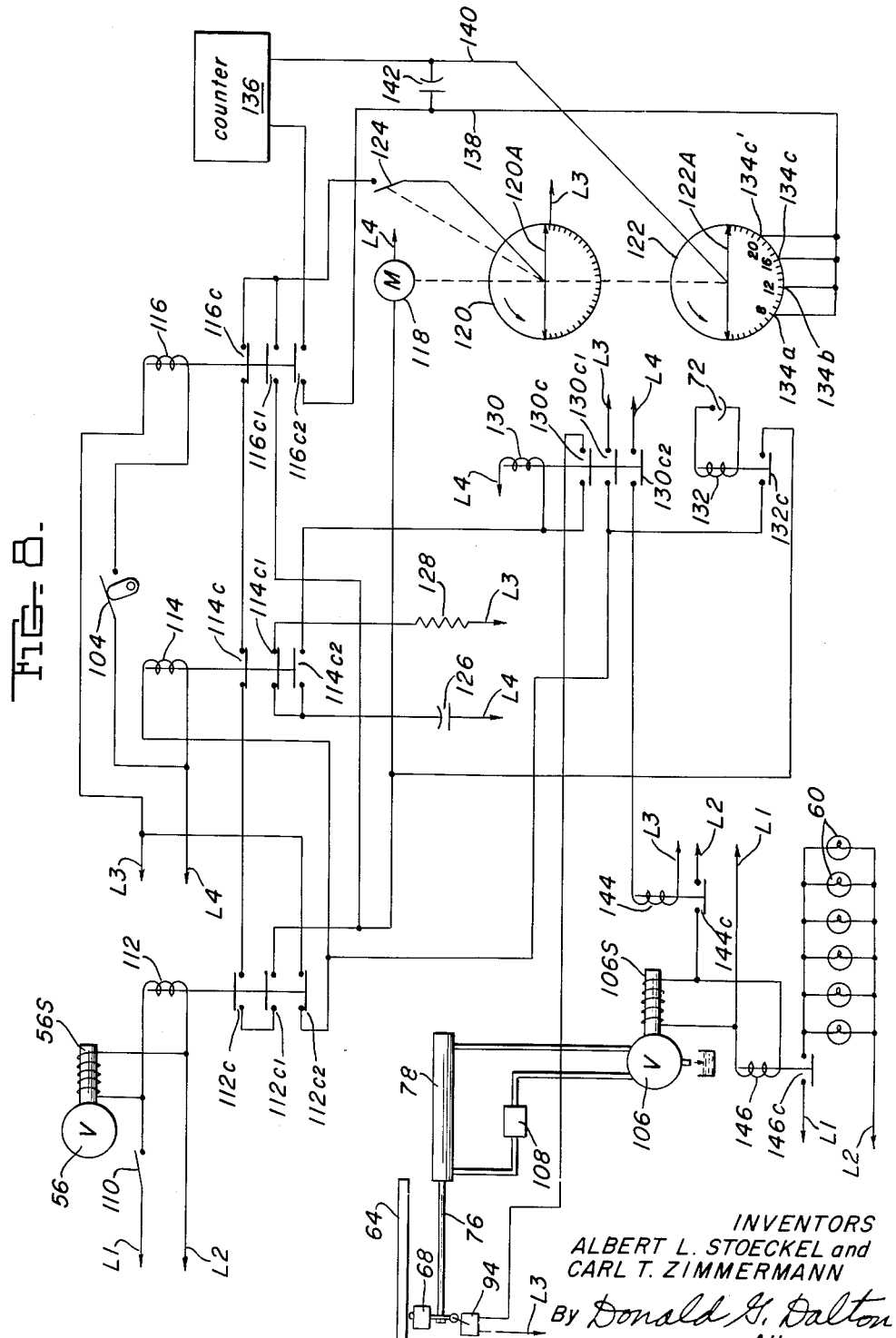

2,975,969

APPARATUS FOR FEEDING AND COUNTING BILLETS

Albert L. Stoeckel, Euclid, and Carl T. Zimmermann, Cleveland Heights, Ohio, assignors to United States Steel Corporation, a corporation of New Jersey Filed Oct. 10, 1957, Ser. No. 689,319

7 Claims. (Cl. 235—98)

This invention relates to apparatus for feeding and counting billets and more particularly to such apparatus for feeding and counting billets delivered to a furnace for heating prior to rolling the billets into rods. Such billets are normally delivered to a conveyor in numbers varying from 1 to 4 arranged across the width of the conveyor and, after positioning against a stop, are delivered in groups into the furnace. Prior to our invention, no suitable counting system was available for counting these billets accurately.

It is therefore an object of our invention to provide apparatus for feeding and counting billets fed by a conveyor in random groups.

This and other objects will be more apparent after referring to the following specification and attached drawings, in which:

Figure 1 is a schematic plan view of a conveyor with parts removed and showing the location of parts of the counting mechanism;

Figure 2 is an enlarged side elevation of the forward end of the conveyor of Figure 1;

Figure 3 is an enlarged view taken on the line III—III of Figure 1;

Figure 4 is an enlarged transverse vertical section showing parts of the counting system;

Figure 5 is a top plan view of Figure 4 with parts removed;

Figure 6 is a view taken on the line VI—VI of Figure 4;

Figure 7 is an enlarged view taken on the line VII—VII of Figure 1; and

Figure 8 is a schematic diagram of the hydraulic system and electrical circuits of our invention.

Referring more particularly to the drawings, the reference numeral 2 indicates a conveyor having longitudinal side walls 4, driven rolls 6 and idler rolls 8. The driven rolls 6 are preferably skewed, that is, arranged with their axes at an angle to transverse planes through the conveyor. The rolls 6 may be individually driven but are shown as driven from a motor 10 through gear reducer 12, shaft 14 and bevel gears 16 and 18. The sides 4 are mounted on a base plate 20 and the rolls 6 and 8 extend above the base plate so as to support billets B which are to be conveyed to a heating furnace 22. Rails 24 are mounted on top of the sides 4 and support rolls 26 of a billet pusher 28. The pusher 28 has a pair of chains 30 connected thereto by means of arms 32. The chains 30 pass around sprockets 34 and 36. Sprockets 34 are driven by means of a motor 38 through a shaft 40. A billet stop 42 is arranged below the plate 20 several feet from the entry side of the furnace 22. One end of the stop 42 is pivotally mounted on a pin 44 and the other end is pivotally attached to one end of a link 46. The other end of link 46 is pivotally attached to one end of a second link 48, the other end of the link 48 being pivotally mounted on a pin 50. An hydraulic motor 52 has its piston rod connected to pin 54 which connects the links 46 and 48. A four-way solenoid operated valve 56 controls flow of fluid to and from the hydraulic motor 52. The parts so far described are conventional. A framework 58 is mounted adjacent the conveyor 2 on the entry side of stop 42 and extends upwardly above the conveyor where it supports a plurality of lights 60 which extend transversely across the conveyor 2. A transverse slot 62 is provided in the plate 20 directly beneath the lights 60. A scanning plate 64 is located directly beneath the slot 62 and as shown in Figure 4 has twenty-four vertical holes 66 therein. This number may vary as required. A carriage 68 is supported beneath the plate 64 on rods 70 which extend transversely of the conveyor. Carriage 68 carries a photo-electric tube 72 and a lens 74 which acts as a collimator. A piston rod 76 is connected to the carriage 68 and also to the piston of hydraulic cylinder 78. An electric cable or cord 80 is connected to the output of photocell 72 and passes around a sheave 82 to a sheave 84 mounted with its axis vertical on a carriage 86 which is mounted for slidable movement on a pair of rods 88. A spring 90 is attached to the carriage 86 and to supporting framework 92. A limit switch 94 having a normally closed contact is mounted to be actuated by the carriage 68 at the forward end of its travel.

A chain 96 (Figure 7) is connected to the shaft 40 and drives a gear reducer 98 having a cam shaft 100 connected thereto. The shaft 100 carries a cam 102 which actuates a limit switch 104 having a normally open contact. The relationship between the speed of the shafts 40 and 100 is such that the shaft 100 will make less than one revolution while the pusher 28 moves the full length of its travel and the dwell on the cam 102 is such that the switch 104 will remain closed while the carriage 28 pushes the billets B from the stop 42 into the furnace and returns. Flow of fluid to the cylinder 78 is controlled by means of a solenoid operated four-way valve 106. A valve 108 is provided in the line to the return side of the cylinder 78 and is so designed that it creates a back pressure when the scanner moves forwardly, that is, from right to left as shown in Figure 8 but will permit free flow when the scanner carriage is moved in the opposite direction. Thus the carriage 68 will move slowly from right to left but rapidly from left to right as shown in Figure 8. The valve 106 is operated by solenoid 106S to position it to move the carriage 68 from right to left and has a spring return for returning it to the opposite position when the solenoid 106S becomes deenergized.

A switch 110 controls flow of current from A.C. power source L1—L2 to solenoid 56S which operates valve 56 and also to relay coil 112 which has normally open contacts 112C and 112C1 and normally closed contact 112C2. Contact 112C2 is in series with a relay coil 114 to which current is supplied from a 24 volt D.C. power source L3—L4. Relay 114 has normally closed contacts 114C and 114C1 and normally open contact 114C2. A relay coil 116 is connected to power source L3—L4 through cam switch 104. Relay coil 116 has normally closed contact 116C and normally open contacts 116C1 and 116C2. Contacts 112C, 112C1, 114C and 116C are connected in series with motor 118. Contact 112C1 does not close until a given time, such as two seconds, after coil 112 is energized. Motor 118 is mechanically connected to sweep arms 120A and 122A of selector switches 120 and 122. As shown these selector switches 120 and 122 have twenty-six contacts. An interrupter switch 124 is mechanically connected to sweep arm 120A so that it will open and close each time the arm 120A moves from one contact to the next. A ratchet connection may be provided for this purpose. The switch 124 is connected in series with contacts 112C, 112C1, 114C and 116C and also with arm 120A. Contact 114C1 is connected in series with a condenser 126 and resistor 128. Contact 114C2 is connected in series with a relay coil 130 which has normally open contacts 130C, 130C1 and 130C2. Contact 130C is connected in series with switch 94 and coil 130. Contact 130C1 is connected in series with motor 118 and contact 132C of relay 132 operated by photocell 72. Contact 116C1 is connected in parallel with contacts 112C, 112C1, 114C and 116C. Selector switch 122 has parallel leads 134a, 134b, 134c and 134c' connected to its 8th, 12th, 16th and 20th contacts. These leads are connected to a count recorder 136 through lead 138 having contact 116C2 therein. Arm 122A is connected to recorder 136 through lead 140. A condenser 142 is connected across leads 138 and 140. Contact 130C2 is connected in series with a relay coil 144 having normally open contact 144C which is conected in series with solenoid 106S. Contact 144C also controls flow of current to relay coil 146 having normally open contact 146C which controls flow of current to lights 60.

Assume that the power is on the counter 136, the stepping switches and scanning equipment, that the stepping switches are at zero position, that the scanner is at its right hand position and the photocell 72 dark and that no billets B are on the conveyor. Assume further that one billet will darken four or five of the holes 66, two billets from 8 to 10 holes, three billets from 12 to 15 holes and four billets from 16 to 20 holes. The operator then loads the conveyor and depresses switch 110 to energize solenoid 56S and raise billet stop 42. He then moves the billets against the stop 42 and opens switch 110 to deenergize solenoid 56S and lower stop 42. This also deenergizes relay coil 112 closing contact 112C2 to complete a circuit through coil 114. This closes contact 114C2, thus sending a charge from condenser 126 through coil 130 to momentarily energize it. This closes contact 130C thus locking coil 130 in. Closing of contact 130C2 lights the lights 60 and moves valve 106 to start the carriage 68 on its scanning stroke. When the photocell 72 sees light through a port which is not covered by a billet, relay 132 is energized to close contact 132C and energize motor 118, thus causing it to move sweep arms 120A and 122A from the first to second contacts of each selector switch 120 and 122. Each additional light pulse seen by photocell 72 causes selector switch contacts to advance one more step. When the carriage 68 completes its forward travel it contacts and opens switch 94, thus deenergizing coil 130. This opens contact 130C2, thus deenergizing coil 144 so that the lights 60 go out and solenoid 106S is deenergized permitting its spring to return it to the position where carriage 68 will be retracted at a fast rate. If the switch arm 122A has advanced to any contact "1" through "8" on its scale, it is an indication that four billets are on the conveyor, if it has advanced to "9" through "12" three billets, if it has advanced to "13" through "16" two billets, if it has advanced to "17" through "20" one billet, and if "21" or more, no billet. If no billets are present selector switch will advance 24 steps. The operator then starts the pusher 28 and moves the billets into the furnace 22. This closes switch 104 for a predetermined time, thus energizing coil 116 and closing its contact 116C1. This energizes motor 118 through sweep arm 120A and causes the sweep arm to advance until the opposite end thereof arrives at the No. 1 contact which is not connected to line L3. This may be termed a homing operation. Contact 116C2 also closes and as wiper arm 122A revolves with arm 120A it sends a pulse to recorder 136 each time the arm 122A passes over a contact connected to leads 134a, 134b, 134c and 134c' as it completes its travel through 180° back to its "home" position. The number of billet count pulses sent to recorder 136 depends on the position of arm 122A at the time of the "homing" operation. The system is then ready for another cycle.

If the billet stop 42 is dropped momentarily and then raised the scan cycle is initiated and will be completed. However, another homing circuit is provided since relay coil 112 was again energized when the stop was raised the second time. This closes contact 112C at once and contact 112C1 a few seconds later. Thus a homing circuit is completed through contacts 112C, 112C1, 114C and 116C. Relay coil 116 is not energized because switch 104 is not closed and no impulse can go to recorder 136. The time delay contact 112C1, 122C1 prevents erroneous count if the stop 42 is raised in error momentarily and then drops.

While one embodiment of our invention has been shown and described it will be apparent that other adaptations and modifications may be made without departing from the scope of the following claims.

We claim:

1. Apparatus for feeding and counting billets or the like comprising a conveyor, a scanning plate having substantially vertical holes therein located adjacent said conveyor and positioned transversely of the conveyor, means mounting said scanning plate in fixed relationship with said conveyor, a carriage mounted adjacent one side of said plate for movement transversely of said conveyor, a light source on the side of said plate and said conveyor opposite said carriage and extending transversely of said conveyor, a photosensitive device carried by said carriage, said conveyor having an opening therein permitting passage of light between said light source and said photosensitive device, means for moving said carriage back and forth transversely of said conveyor, means operable by said photosensitive device to indicate a count each time said photosensitive device receives light through a hole in said scanning plate, and means for turning said light source off at the end of the scanning stroke and maintaining it off during travel of said carriage in the reverse direction.

2. Apparatus for feeding and counting billets or the like comprising a conveyor, a scanning plate having substantially vertical holes therein located adjacent said conveyor and positioned transversely of the conveyor, a carriage mounted on one side of said plate for movement transversely of said conveyor, a light source on the opposite side of said plate extending transversely of said conveyor, a photosensitive device carried by said carriage, said conveyor having an opening therein permitting passage of light between said light source and said photosensitive device means for moving said carriage back and forth transversely of said conveyor, means operable by said photosensitive device to indicate a count each time said photosensitive device receives light through a hole in said scanning plate, and means operable by said carriage at the end of its scanning stroke for turning said light source out and reversing movement of said carriage.

3. Apparatus for feeding and counting billets or the like comprising a conveyor, a scanning plate having substantially vertical holes therein located adjacent said conveyor and positioned transversely of the conveyor, a carriage mounted on one side of said plate for movement transversely of said conveyor, a light source on the opposite side of said plate extending transversely of said conveyor, a photosensitive device carried by said carriage, said conveyor having an opening therein permitting passage of light between said light source and said photosensitive device, means for moving said carriage back and forth transversely of said conveyor, a selector switch having a sweep arm, and means operable to move said sweep arm one step each time said photosensitive device receives light through a hole in said scanning plate.

4. Apparatus for feeding and counting billets or the like comprising a conveyor, a stop across said conveyor for positioning said billets, means for moving said stop into and out of its operative position, a pusher for feeding positioned billets forwardly, a scanning plate having substantially vertical holes therein located adjacent said conveyor and positioned transversely of the conveyor, a carriage mounted on one side of said plate for movement transversely of said conveyor, a light source on the opposite side of said plate extending transversely of said conveyor, a photosensitive device carried by said carriage, said conveyor having an opening therein permitting passage of light between said light source and said photosensitive device, means for moving said carriage back and forth transversely of said conveyor, means operable by movement of said stop from its operative position for lighting said light source and starting said carriage on its scanning stroke, and means operable by said photosensitive device to indicate a count each time said photosensitive device receives light through a hole in said scanning plate.

5. Apparatus for feeding and counting billets or the like comprising a conveyor, a stop across said conveyor for positioning said billets, means for moving said stop into and out of its operative position, a pusher for feeding positioned billets forwardly, a scanning plate having substantially vertical holes therein located adjacent said conveyor and positioned transversely of the conveyor, a carriage mounted on one side of said plate for movement transversely of said conveyor, a light source on the opposite side of said plate extending transversely of said conveyor, a photosensitive device carried by said carriage, said conveyor having an opening therein permitting passage of light between said light source and said photosensitive device, means for moving said carriage back and forth transversely of said conveyor, means operable by movement of said stop from its operative position for lighting said light source and starting said carriage on its scanning stroke, means operable by said photosensitive device to indicate a count each time said photosensitive device receives light through a hole in said scanning plate, and means operable by said carriage at the end of its scanning stroke for turning said light source out and reversing movement of said carriage.

6. Apparatus for feeding and counting billets or the like comprising a conveyor, a stop across said conveyor for positioning said billets, means for moving said stop into and out of its operative position, a pusher for feeding positioned billets forwardly, a scanning plate having substantially vertical holes therein located adjacent said conveyor and positioned transversely of the conveyor, a carriage mounted on one side of said plate for movement transversely of said conveyor, a light source on the opposite side of said plate extending transversely of said conveyor, a photosensitive device carried by said carriage, said conveyor having an opening therein permitting passage of light between said light source and said photosensitive device, means for moving said carriage back and forth transversely of said conveyor, a first selector switch having a sweep arm, a second selector switch having a sweep arm, a count recorder, means operable by movement of said stop from its operative position for lighting said light source and starting said carriage on its scanning stroke, means operable to move said sweep arms one step each time said photosensitive device receives light through a hole in said scanning plate, and means operable by feeding movement of said pusher to return said sweep arms to their original positions and to connect said second selector switch to said count recorder to record the number of billets being fed.

7. Apparatus for feeding and counting billets or the like comprising a conveyor, a stop across said conveyor for positioning said billets, means for moving said stop into and out of its operative position, a pusher for feeding positioned billets forwardly, a scanning plate having substantially vertical holes therein located adjacent said conveyor on the entry side of said stop and positioned transversely of the conveyor, a carriage mounted on one side of said plate for movement transversely of said conveyor, a light source on the opposite side of said plate extending transversely of said conveyor, a photosensitive device carried by said carriage, said conveyor having an opening therein permitting passage of light between said light source and said photosensitive device, means for moving said carriage back and forth transversely of said conveyor, a first selector switch having a sweep arm, a second selector switch having a sweep arm, a count recorder, means operable by movement of said stop from its operative position for lighting said light source and starting said carriage on its scanning stroke, means operable to move said sweep arms one step each time said photosensitive device receives light through a hole in said scanning plate, means operable by said carriage at the end of its scanning stroke for turning said light source out and reversing movement of said carriage, and means operable by feeding movement of said pusher to return said sweep arms to their original positions and to connect said second selector switch to said count recorder to record the number of billets being fed.

References Cited in the file of this patent

UNITED STATES PATENTS

| | | |
|---|---|---|
| 2,584,052 | Sandorff et al. | Jan. 29, 1952 |
| 2,632,588 | Hoar | Mar. 24, 1953 |
| 2,661,902 | Wolff et al. | Dec. 8, 1953 |
| 2,808,661 | Berggreen | Oct. 8, 1957 |
| 2,812,137 | Curtis et al. | Nov. 5, 1957 |

FOREIGN PATENTS

| | | |
|---|---|---|
| 1,160,004 | France | Feb. 24, 1958 |